United States Patent [19]

Johnsen

[11] Patent Number: 5,551,674
[45] Date of Patent: Sep. 3, 1996

[54] ADJUSTABLE RESILIENT SUPPORT DEVICE

[76] Inventor: Thore K. Johnsen, U.S. Flyer, Inc. 285 Chambers Ave., Eastmeadow, N.Y. 11554

[21] Appl. No.: 271,161

[22] Filed: Jul. 6, 1994

[51] Int. Cl.⁶ .................................................... F16F 1/06
[52] U.S. Cl. ........................ 267/168; 267/175; 267/177; 280/291
[58] Field of Search .................................. 267/167, 168, 267/166.1, 170, 175, 177, 272, 288–291, 131, 132, 212–214; 280/276, 220, 226.1, 283; 297/208, 209; 248/601, 575, 576, 578

[56] References Cited

U.S. PATENT DOCUMENTS

| 3,087,583 | 4/1963 | Bruns | 267/175 |
| 3,613,520 | 10/1971 | Worden | 267/175 |
| 4,120,489 | 10/1978 | Borlinghaus | 267/166.1 |
| 4,377,280 | 3/1983 | Wienand | 267/167 |
| 4,634,109 | 1/1987 | Cigolotti | 267/177 |
| 4,653,736 | 3/1987 | Pontoppidan | 267/168 |
| 4,828,237 | 5/1989 | Neff | 267/166.1 |
| 5,236,169 | 8/1993 | Johnsen | 248/561 |

Primary Examiner—Robert J. Oberleitner
Assistant Examiner—C. T. Bartz
Attorney, Agent, or Firm—Ladas & Parry

[57] ABSTRACT

A resilient support device for installation on seat or wheel fork supports of light vehicles, such as bicycles or motorcycles, for the comfort of the rider. The invention achieves arbitrary and discretionary adjustment of support stiffness with a high degree of variability to accommodate riders over a wide range of weight and road conditions from mild to rough. Novel mechanical configurations are disclosed for ease of adjustment over the range of operation.

21 Claims, 3 Drawing Sheets

ADJUSTABLE RESILIENT SUPPORT DEVICE

BACKGROUND OF THE INVENTION

1. Field of Invention

This invention relates generally to apparatus for introducing adjustable and discretionary stiffness to a support device employed for providing resilient response to road shocks encountered by light vehicles such as bicycles or motorcycles. The apparatus can be installed at the seat, wheel forks, or other locations of such vehicles.

2. Brief Description of the Prior Art

The prior art is replete with efforts to deal with the effects of road shocks encountered during normal use of light vehicles such as bicycles and motorcycles. A variety of devices have been applied to the seats, wheel forks, and other locations of such vehicles. Some representative examples of the prior art will be described herein. Examples that employ spring-like devices or adjustable seat orientation include: U.S. Pat. Nos. 5,226,624 to Kingsbery; 5,294,173 to Yu; 5,294,174 to Bigolin; and 5,236,169 to Johnsen, the inventor of the present invention. An example that employs hydraulic damping is U.S. Pat. No. 5,301,974 to Knapp. While these devices may be suitable for the particular purposes they address, they would not be as suitable for the purposes of the present invention as hereinafter described.

Kingsbery discloses means for mounting a bicycle seat to the upper end of a support post of a bicycle frame. To vary the orientation of the seat, means for forward and rearward tilting is provided. Kingsbery also provides a means for preventing unwanted movement of the support and the seat with respect to the seat post.

Yu discloses a saddle (i.e. seat) support consisting of a metal tubular body mounted to the bottom side of a bicycle saddle. Disclosed are details of the tubular body that provides both structural support for the saddle and resilient response to road shocks.

Bigolin discloses a safety saddle for bicycles. A relatively stiff frame element is attached to the bicycle or motorcycle below a framework element that defines the seat portion of the saddle and provides support for the saddle. Two coil springs situated between the frame element and framework element allow relative movement, while resiliently resisting forces that would bring these members together. A telescoping element covering each coil spring prevents possible injury to the user by way of contact with compressing springs.

Knapp discloses a system for a bicycle or similar vehicle that applies shock isolation at the location of the seat, handle bar, or other location. Shock absorption is provided from the frame to the seat through the use of a hydraulic assembly featuring variable damping. Internal springs are included for the purpose of adjusting the preloading of the hydraulic system.

An additional item of prior art is a patent owned by the inventor of the present invention (U.S. Pat. No. 5,236,169). Disclosed is an assembly of two concentric coil springs for resilient response to road shocks and a support member that passes through the assembly of springs. In one embodiment of this concept, the two concentric springs are wound with opposite helical sense; although preferred, this relationship is not essential.

None of the prior art devices discloses arbitrary and discretionary setting of stiffness and means for adjusting resilient response to road shocks in the manner proposed by the present invention. Kingsbery merely provides for adjustable orientation of the seat. Both Yu and Bigolin provide spring-like resilient support but without means to adjust stiffness. Knapp provides adjustment for the purpose of controlling hydraulic damping action rather than to control resilient response to road shocks. Adjustable springs are employed internally to the hydraulic cylinder to set the pre-loading of the cylinder.

SUMMARY OF THE INVENTION

The present invention provides means for the arbitrary and discretionary introduction of variable stiffness at the seat, wheel forks, or other locations on, but not limited to, light vehicles such as bicycles or motorcycles for the purpose of handling typical unpredictable and/or predictable road shocks. The invention can be employed in any type vehicle, even heavy vehicles (when applied to resilient support devices in such vehicles, for example when applied to the seat of a tractor). Particular emphasis is given to personal comfort for riders over a range of their individual weight. The stiffness of resilient response is controlled easily to accommodate differing individual riders and differing road conditions, and such user control may be effected while the rider is on the vehicle and without impact on the ride (important, for example, in cross-country racing).

Adjustable stiffness is achieved through the arbitrary and discretionary control of resilient members in various combinations of stiffness and extension. This result can be realized in several ways that will be described subsequently, and each approach features convenient selection of stiffness to suit the individual comfort and preference of the rider. In a preferred embodiment, the entire device lies compactly within two vertically spaced apart containment caps that both restrict and control the springs and that ultimately play an important role in providing the desired variable resilient response.

In a preferred embodiment, a system of inner and outer coil spring members is employed. Typically, the coil springs are wound in helical fashion but not necessarily in cylindrical fashion. The outer spring member is always active and typically is not adjustable, although it may exhibit nonlinear compression or extension characteristics. An inner spring member is easily and conveniently adjustable by the rider. This adjustment provides for variable stiffness to accommodate the weight of the rider or to accommodate rider preference with respect to varying road conditions. In response to road shocks, the spring system reacts with a momentary resilient displacement; the extent or range of this displacement, for a given rider weight, varies with strength of the impact or the amplitude of the force generated by any particular shock.

In other embodiments, stiffness of response can be set conveniently and arbitrarily (a) to increase continuously with displacement and/or (b) to introduce a regime of higher stiffness to occur only after an initial displacement at lower stiffness. Stiffness as a function of displacement can be linear or non-linear depending on the design of either or both the inner and outer spring arrangements.

To accomplish the above and related objectives, the invention may be embodied in the form illustrated in the accompanying drawings. Attention is called to the fact that the drawings are only illustrative, and that changes may be made in the specific construction illustrated and described without departing from the scope of the invention as claimed in the appended claims.

DETAILED DESCRIPTION OF THE INVENTION

Figure 1:
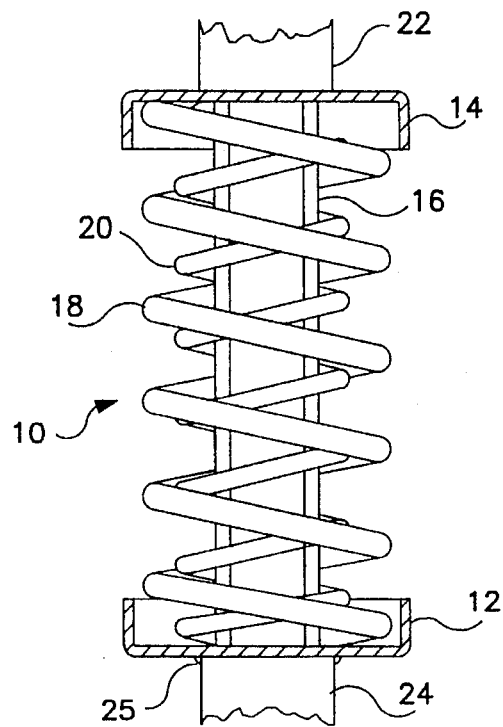
FIG. 1 is a schematic illustration of some elementary parts of the invention in their most simple form and relationship. In the form presented, this figure discloses prior art.

In the following description, similar reference characters in the drawings denote similar elements throughout the several views.

FIG. 1 illustrates in simplified form the general relationship between several of the essential elements of the resilient support device 10. As presented, this figure basically constitutes prior art as previously disclosed by the inventor, but some general features also will be employed in the present invention. This simplified figure has been introduced to facilitate subsequent explanation.

The resilient support device 10 is contained within a nominally circular first containment cap 12 and a nominally circular second containment cap 14. Confined within the first and second containment caps are generic outer spring 18 and generic inner spring 20, both of which are shown in simplified form. These springs are shown as wound in cylindrical form and with opposite helical sense, although this relationship is not required. Such opposite windings serve two functions: (a) to prevent possible injury by restricting the depth to which the riders fingers can inadvertently penetrate into the spring assembly and (b) to prevent possible mechanical interference between the inner and outer springs resulting from interleaving of the coils.

Passing through the nominal center of the springs is guide shaft 16. Upper support member 22 and lower support member 24 provide connection between support device 10 and portions of the vehicle being served. For example in a representative application, upper support member 22 extends upwardly to a bicycle seat, and lower support member 24 extends downwardly to a bicycle frame. In a preferred embodiment of the invention, containment caps 12 and 14 can rotate respectively around support members 24 and 22, respectively. In some embodiments, as will be explained, at least the bottom containment cap 12 is fixed, such as by welding (shown at 25), to its corresponding support member 24. Guide shaft 16 must be grooved, non-circular, or in some other manner be formed to provide means to restrict the rotation of a surrounding inner spring element yet to be described. Shaft 16 is indicated in FIG. 1 as being hexagonal in cross-section.

As explained, both inner and outer springs lie within containment caps 12 and 14. Two results can be achieved by varying the distance separating these containment caps. First the initial stiffness of the outer spring 18 can be set. Second, the vertical position or height of the seat can be adjusted and set. Provision can be made for sliding one or both of the containment caps along guide shaft 16 and then locking them into position. A threaded rod driven by an external knob, passing through either support member 22 or 24, and bearing on guide shaft 16 can accomplish this result. This arrangement is described with reference to the inventor's U.S. Pat. No. 5,236,169.

Figure 2:
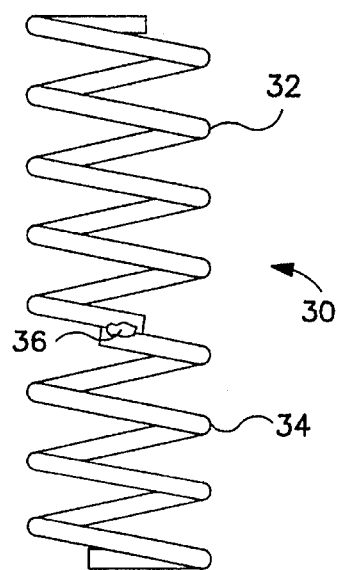
FIG. 2 illustrates an outer spring formed from two segments of different wire diameter welded together at a nominal midpoint.

FIG. 2 illustrates further detail regarding the outer spring that was shown generically in FIG. 1 as element 18. In the example of FIG. 2, outer coil spring 30 is wound as a left hand helix and is assembled from two segments. First outer spring segment 32 is a helical coil formed from wire of a certain diameter. Second outer spring segment 34 is also a helical coil, but it is formed from wire of a diameter different from that of segment 32. Spring segments 32 and 34 are joined together at joint 36 to form a permanent spring assembly 30 of two spring segments. Typically, this joint 36 can be formed by welding, silver solder, or any similar process. Instead of bonding one spring segment 32, 34 to another, a coupling member (not shown) can be inserted between the segments 32, 34, such as an annular ring having an "H" cross section.

Figure 5A:
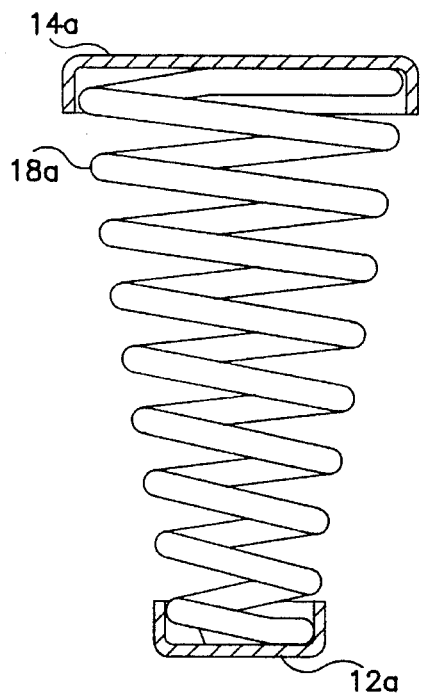
FIGS. 5A and 5B illustrate alternate outer spring configurations.
Figure 5B:
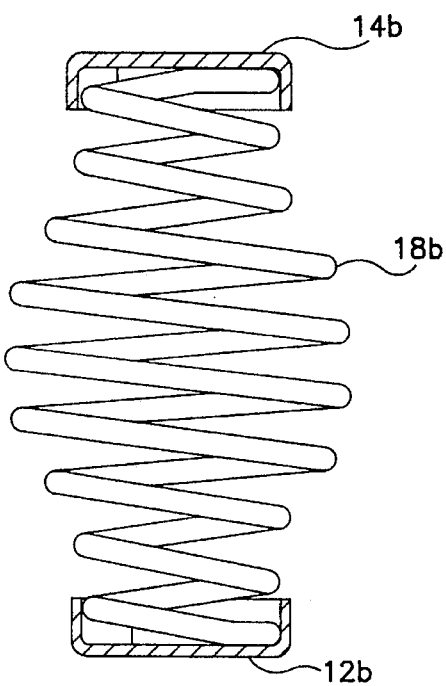

Alternatively, outer spring assembly 30 may be formed by extruding wire while varying its diameter; or outer spring assembly 30 may have a constant wire diameter throughout its length but may be wound along its axis with varying spring diameter, example being springs of conical or barrel shape in cross section as seen in FIGS. 5A and 5B respectively. Outer spring assembly 30, shown in FIG. 2, is an example of a spring assembly exhibiting variable stiffness as a function of displacement.

The operation of the present invention is particularly involved with the detailed operation of various combinations of springs. For complete understanding of the function of these combinations, further explanation is required. First, a distinction must be made between a truly shock absorbing device and an elastic resilient device such as employed in the present invention. True shock absorption requires dissipation of energy through damping, such as that produced in a dashpot or hydraulic cylinder (e.g., Knapp above). A resilient device (e.g., spring) provides the observed comfort through elastic action that smooths and spreads the effect of an applied force (shock), without absorbing energy. Resilient devices and energy absorbing devices are often employed in combination for greater effect.

A coil spring generates its resistance by way of torsion. Consider a straight rod fixed at one end and to which a torque is applied at the other end. In response to an applied torque, the rod twists, and the resulting shear stress is maintained until the torque is balanced. The total twist in the rod is the result of the shear strain integrated along the length of the rod. In the case of a wire formed into a coil spring, an applied force axially of the spring produces torsion along its coiled wire length (and corresponding resistance to the applied force) in a manner similar to that described in the example of the twisted straight rod. Because of the helical configuration, however, the twist produced by the integrated shear strain acting along the length of the helix results in the familiar axial displacement of the spring. Particular relationships between shear strain and axial displacement in coil springs is vital to the performance of the present invention.

FIG. 2 shows a compound outer coil spring assembly 30 formed with a combination of two spring segments 32, 34 made from wires having different diameters. The combined spring segments can be thought of as acting in series. As a spring axial force is applied, both spring segments compress, but spring 34, having a smaller wire diameter, will contract more than spring 32 having the larger wire diameter, because the former sustains a higher level of shear stress. Thus, during the initial portion of compression, the combination of the two springs 32, 34 is compliant at an intermediate level, i.e. stiffer than an equivalent spring 34 of full length, but more compliant than an equivalent spring 32 spanning the full length of the outer coil spring assembly 30. As more force is applied, eventually spring 34 will be fully compressed, and stiffer spring 32 will act alone.

Figure 3:
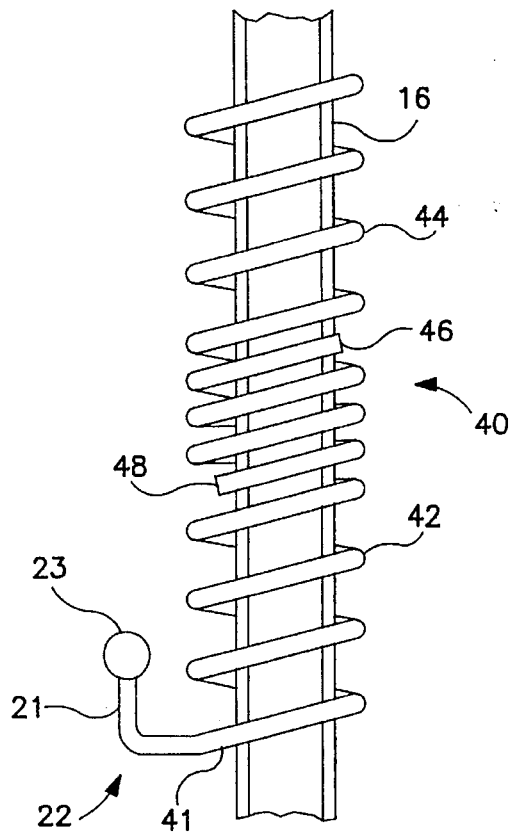
FIG. 3 illustrates a typical split inner spring consisting of two elements. It shows the manner in which the free spring element is driven axially by the user controlled spring element to generate an arbitrary adjustment of spring characteristics.

FIG. 3 illustrates an adjustable inner spring assembly 40 that is a combination of coil springs 42, 44 in contrast to the simple generic inner spring shown as element 20 in FIG. 1. Inner spring assembly 40 is shown to consist of first inner coil spring 42 terminating at a first end 46 and second inner coil spring 44 terminating at a first end 48; thus the two spring elements are, as shown in the example of their relative exemplary positions in FIG. 3, threadably intertwined for approximately two turns. Also, the figure shows the two spring elements wound with wire of the same diameter; in other embodiments wires of different diameters can be used resulting in a compound spring, as will be discussed below. The helical lead (i.e. turns per unit length) for the two springs 42, 44 must be substantially the same for the lead screw action to function properly. Guide shaft 16 is shown as a hexagonal rod passing completely through the assembly of springs 30, 40. Ball lever 22 enables the rider to rotate coil spring 42 to control total active length of the inner spring assembly. A ball 23 is shown in FIG. 3 as being placed at the end of an extension 21 of first inner coil spring 42 that extends from the bottom end 41 of inner coil spring 42 beyond its essentially cylindrical shape to a location outside the support device so that it can be reached by the rider. Typically, when coil spring 42 is rotated in this manner by the rider, outer coil spring 30 (FIG. 2) also may be rotated within the containment caps without detrimental effect.

Figure 3A:
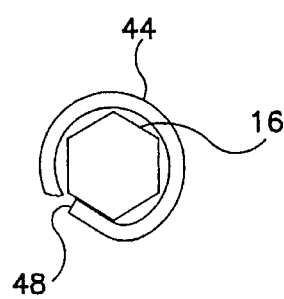
FIGS. 3A and 3B show alternate ways of preventing spring rotation about a central guide shaft.
Figure 3B:
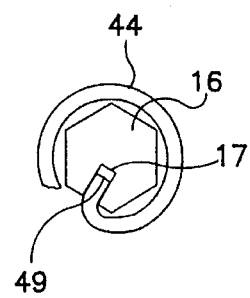

In a preferred embodiment of the invention, first inner coil spring 42 is free to rotate around guide shaft 16 as it is turned in a circular path by way of ball lever 22 which is movable in a circle about the axis of shaft 16. Ball lever 22 and first inner coil spring 42 are restrained from movement axially, however. Second inner coil spring 44 is restrained from rotation around guide shaft 16 but is free to be moved axially under the influence of the rotation of spring 42. Such rotational restraint of spring 44 can be achieved by employing a special shape or cross section for guide shaft 16, for example, as shown in FIG. 3A. End 48 of spring 44 can be crimped against a face of the guide shaft 16 if the latter is formed with hexagonal cross-section. In another embodiment, as seen in FIG. 3B, guide shaft 16, regardless of its cross sectional shape, can be grooved to accommodate an end 49 of spring 44 that is bent into axial sliding engagement with groove 17. Other similar approaches can be employed to achieve the desired effect of allowing spring 44 to move axially along guide shaft 16, while it is restrained from rotating around that shaft.

The interaction of the two inner coil spring segments 42, 44 is thus similar to that achieved with a lead screw, in that rotation of spring segment 42 can translate spring segment 44 axially along guide shaft 16 in either direction. The result is that the effective total length and compression characteristics of the combination of two inner spring segments are arbitrarily adjustable by the rider via ball lever 22. When at maximum length, the two segments 42, 44 act in series; when at minimum length, they act in parallel. Continuous adjustment between these extremes provides a wide range of stiffness selectable by the rider. Moreover, at any relative position of segments 42, 44 less than maximum extension, where the top of upper segment 44 separates from upper containment cap 14, a threshold can be set, below which inner spring assembly 40 is not active and above which it responds to applied shock forces.

A preferred embodiment of the present invention now can be understood by modifying the simple generic configuration shown in FIG. 1 to include features of the more detailed spring elements shown in FIGS. 2 and 3.

Consider that the simple outer spring shown in FIG. 1 is exchanged for the compound outer spring shown in FIG. 2. This compound outer spring consists of a combination of two springs permanently joined together to function in series. Joining two springs provides an opportunity to employ springs made from wire having different diameters. In this manner the overall stiffness of the combined spring can be made to vary with displacement. As described above, for relatively small total displacements, the greater portion of the movement involves the element with the smaller wire diameter; while for the largest displacements, the element with the larger wire diameter eventually is involved alone at the level of the greatest stiffness. An infinite range of stiffness can be realized for displacements between minimum and maximum values.

Consider further that the simple inner coil spring shown in FIG. 1 is exchanged for the combination of two springs shown in FIG. 3. Then, let second inner coil spring 44 be translated in lead screw fashion (by rotating first inner spring 42) so as to be fully engaged with first inner coil spring 42, in which case the combination of two inner springs occupies its minimum length along guide shaft 16 and exhibits maximum stiffness. With this adjustment, only the outer spring is actively involved with any initial displacement resulting from an applied force. This condition represents, for example, the adjustment preferred for a light weight rider or for the smoothest road conditions. For stronger road shocks that produce very large displacements, however, both inner and outer springs can become actively involved, even for a lightweight rider.

Now consider the adjustment where second spring 44 is translated to its least engagement with first spring 42, so that the combination of two inner springs occupies its maximum length along guide shaft 16 and the minimum stiffness. Thus, the inner spring combination 40 has essentially the same length as the outer spring combination 30. Both springs extend fully between the two containment caps 12, 14, and both inner and outer spring assemblies 40, 30 are always actively involved. This condition represents, for example, the adjustment preferred for heavy riders and/or for the roughest road conditions.

The basic disclosure for one preferred embodiment of the invention comprises a compound outer spring 30 and an inner spring assembly 40 split into two parts whose active length is easily adjustable by means of a ball lever 22 controlled by the rider. The ball lever 22 rotates one segment 42 of the inner spring assembly 40 while positioning a second segment 44 of the inner spring assembly 40 axially along guide shaft 16 that passes through the nominal center of the inner and outer springs.

Embodiments other than that for the basic disclosure above lie fully within the concept of this invention. These additional embodiments include other outer spring configurations and other means for controlling both the axial response of the two inner coil springs and the means for adjusting their axial relationship.

Referring to FIGS. 5A and 5B, significant variations in the configuration of the outer spring can be introduced. In place of the basically cylindrical configuration of outer springs 18 and 30 shown in FIGS. 1 and 2, two types of conical configurations can be employed. In one configuration, a single spring 18a is formed as a simple cone in which the wound diameter of the helix is increased essentially uniformly along its axial direction from one end to the other. This arrangement produces the effect of smoothly increasing stiffness as a function of increasing displacement. Thus, for light riders or mild road conditions, a relatively soft initial response of the large diameter portion is dominant. For heavy riders or rough road conditions, the relatively stiffer response of the smaller diameter portion comes increasingly into play. In a simple (single) conical configuration, as described above, the helical diameter varies from the smallest to the largest from one end of the spring to the other. To accommodate the large and small diameter ends of such a spring, the associated containment caps 12a and 14a must be reduced or enlarged correspondingly.

In a second (e.g., double conical) configuration, the helical diameter can be small at one end, uniformly increase toward a large diameter nominal center, and then become small again at the other end. This configuration, shown in FIG. 5B, would have resilient characteristics as a function of displacement similar to that described for the single cone, but would have an advantage in that both containment caps 12b and 14b could be of the same diameter. The configuration for the outer spring may employ a barrel shape in which the wound diameter is varied in curvilinear fashion with the largest diameter occurring at the nominal center. In other respects, this configuration is similar to the double cone. Both the double conical and barrel configurations could be made with a single wire element or with two segments mechanically coupled or permanently joined together at their nominal midpoint and that are otherwise similar, except that those segments may be made from wires of different diameters.

Other important embodiments for the inner spring are also disclosed. In a preferred embodiment, the two spring elements comprising the inner spring assembly can be made with wire having different diameters. With such a configuration, the advantages of variable stiffness are added to those achieved with variable effective length.

Figure 4A:
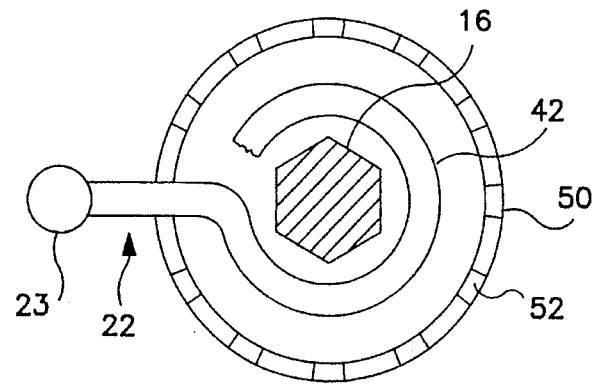
FIGS. 4A, 4B, and 4C show an arrangement for adjusting the inner spring assembly with a ball lever whose angular setting is set via fixed detents in a containment cap or via mating serrated elements.
Figure 4B:
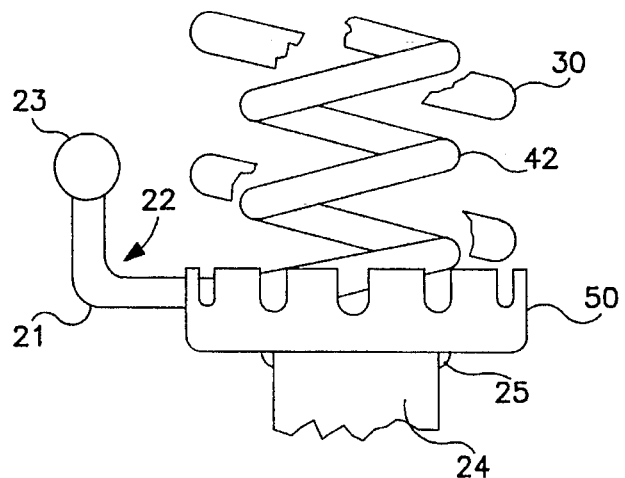

FIGS. 4A and 4B illustrate an arrangement for temporarily setting or locking the inner coil spring assembly at a position in which the angular position of ball lever 22 is restricted to certain circumferential locations. In FIGS. 4A and 4B, such locations comprise fixed detents in a containment cap 50. Such detents may be, as shown, a plurality of notches in the upper ridge of the adjacent containment cap. Shown in the figures are ball lever 22 as an extension of first inner spring 42. A typical outer spring 30 is also indicated. In this example, containment cap 50 is notched at 30 degree intervals. Twelve notches 52 are shown. The extension 21 of first inner coil spring 42 passes through and is retained by a representative notch in the containment cap 50. Hexagonal guide shaft 16 is shown passing through coil spring 42.

Figure 4C:
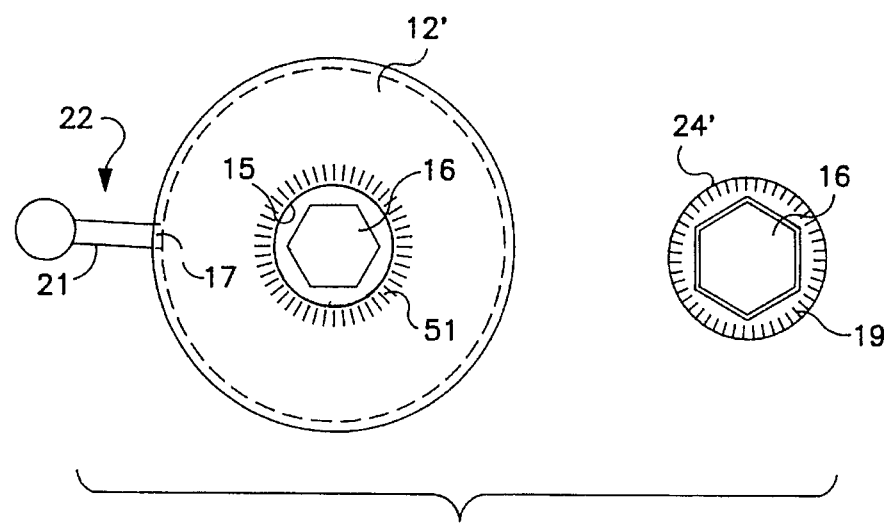

FIG. 4C shows the bottom of a modified first or lower containment cap 12' which has a central opening 15 through which guide shaft 16 passes. Providing a circular opening 15 for the hexagonal guide shaft 16 means that lower containment cap 12' can rotate about shaft 16. The FIG. 4B embodiment solved the problem of a rotating lower containment cap 50 by welding (shown at 25) or otherwise fixing the lower cap 50 to the top of lower support member 24. To reduce production costs, rather than to weld the two parts together, the bottom of lower containment cap 12' has an annular serrated portion 51 surrounding the central opening 15. Likewise, the top edge 19 of modified lower support member 24' has radial serrations matching those of the serrated annular ring 51 on the bottom of lower containment cap 12'. In this manner, when assembled, the two serrated portions 51, 19 are brought together, and the spring force by either the outer spring 30 or both outer and inner spring assemblies 30, 40 causes the mating serrated portions to mesh and prevent rotation of cap 12' about the axis of guide shaft 16. However, by choosing the depth of the serrations in the serrated areas 19, 51 in relation to the spring forces applied, lower containment cap 12' can still be rotated by movement of ball lever 22 by passing extension 21 through an aperture 17 in the side of containment cap 12'. Thus, movement of ball lever 22 in a circle will cause a corresponding rotation of lower containment cap 12' permitting the leadscrew action described earlier as between the first and second inner coil spring segments 42, 44, and the angular position of spring segment 42 is indexed as the serrations of containment cap 12' and support member 24' slide past one another against the bias of springs 30, 40.

In all embodiments of the invention, the movement of ball lever 22 is not restricted to a 360° movement. On the contrary, the range of adjustment for an adjustable resilient support device for a bicycle seat would typically be five full 360° revolutions of ball lever 22. The invention thus not only supplies an effective and convenient adjustment feature, but it also provides for very fine adjustment of the stiffness due to the multi revolutions of ball lever 22 in adjusting from minimum to maximum stiffness of the inner spring assembly 40.

Figure 6:
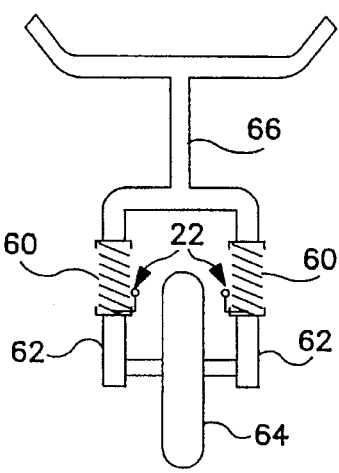
FIG. 6 illustrates the use of the invention for resilient separation of the frame of a typical light vehicle from the front wheel.

FIG. 6 illustrates the application of the invention to the front wheel fork of a typical light vehicle such as a bicycle, motorcycle, three-wheeled vehicle, and the like. In this example, two resilient support devices 60 are employed. A support device 60 is installed in each leg of the front wheel fork 62. Adjustment for balance and the various stiffness parameters as described previously can be applied by the rider through ball levers 22. In this manner, road shocks from wheel 64 are resiliently separated from the frame of the vehicle. Such shocks normally would be transmitted through wheel strut 66. In another embodiment, a single resilient support device could be installed in wheel strut 66 to operate alone and thus achieve essentially the same result.

Figure 7A:
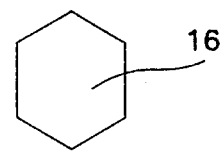
FIG. 7A illustrates a cross-sectional view of the guide shaft.
Figure 7:
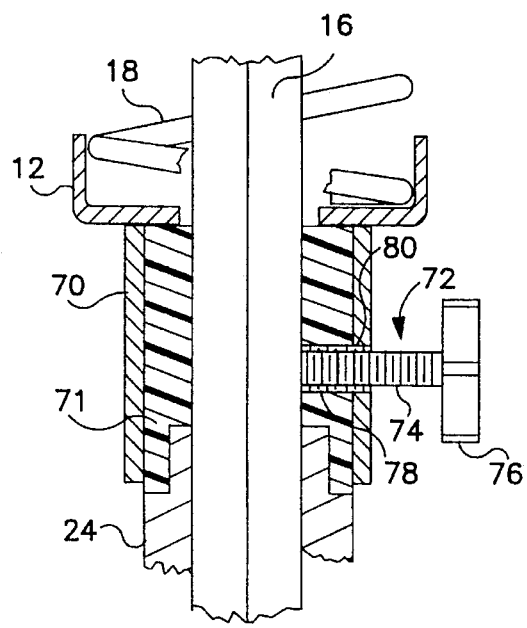
FIG. 7 shows a seat-height/initial-compression adjustment assembly.

FIG. 7 shows an adjustment means which may be employed to set the initial spring compression on the inner and outer spring assemblies 30, 40. It comprises a collar 70, preferably made of hard metal which can be provided with a threaded hole 80 into which a threaded adjustment screw 72 can be screwed. Adjustment screw 72 includes a threaded screw shank 74 and a notched or knurled operating knob 76. Preferably, the lower support shaft 24 is also threaded with internal threads 78. As seen in FIG. 7, the top end of lower support shaft 24 is capped with a nylon (or other plastic material) insert which offers smooth sliding action between the guide shaft 16 and the lower support member 24. If the nylon insert is used, it too is threaded at 78, making it even more important that collar 70 is of hard material and threaded to lock adjustment screw 72 against guide shaft 16. By applying an initial desired pressure on the top support member 22 while screw 72 is loose and then locking the relative positional relationship between shaft 16 and lower support member 24, an initial bias or compression can be set in the spring assemblies 30, 40.

While certain novel features of this invention have been shown and described and are pointed out in the appended claims, the invention is not intended to be limited to the embodiments detailed above. For example, one of ordinary skill in the art can readily, without experimentation, replace the compression spring elements/segments with tension spring elements/segments. Such alteration of the disclosed preferred embodiment is sufficiently self-evident that further description on details of construction need not be presented in this disclosure. It is also to be understood that the adjustable resilient support device according to the present invention can be adapted for use with non-vehicle items. For example, it can be installed in the support post of an office chair, so as to provide adjustable resilient response for the comfort of the user. This would be especially appreciated by heavy weight persons who most certainly impose shock forces on the chair support(s). Finally, it will be understood that various omissions, modifications, substitutions, and changes in the forms and details of the device illustrated, and in its operation, can be made by those skilled in the art without departing in any way from the spirit of the present invention.

I claim:

1. A resilient support device for installation between first and second support parts of a load bearing support member subject to receiving shocks, said device comprising:

an outer coil spring;

an adjustable inner coil spring having first and second ends;

means for coupling each of the ends respectively of said outer coil spring directly to said first and second support parts;

means for coupling one end of said inner coil sprang to one of said first and second support parts; and means for adjusting the compression characteristics of said inner coil spring without affecting the compression characteristics of said outer coil spring.

2. The resilient support device as claimed in claim 1, comprising a pair of containment caps, and wherein:

said outer coil spring lies axially of, and fully extends between, said containment caps;

said inner coil spring is situated concentrically within said outer spring member; and said resilient support device further comprises a guide shaft extending axially through and supporting said inner spring.

3. The resilient support device as claimed in claim 2, wherein said outer coil spring is formed from two segments joined together at a nominal midpoint, said segments being wound with wires of different diameters.

4. The resilient support device as claimed in claim 2, wherein said inner coil spring comprises first and second separate cylindrically wound helical spring elements to form an inner spring surrounding said guide shaft, with each said element having the same helical lead and thus capable of being threadably intertwined with the other spring element.

5. The resilient support device as claimed in claim 4, wherein an end of the first of said helical elements has an extension which extends beyond its basic cylindrical configuration, and beyond its adjacent containment cap, to form a lever with which said first helical element can be manually rotated around said guide shaft.

6. The resilient support device as claimed in claim 4, wherein the second of said helical elements is restrained from rotating around said guide shaft.

7. The resilient support device as claimed in claim 6, wherein said guide shaft is formed with a non-circular cross-section to facilitate rotational restraint of said second helical element with respect to said guide shaft.

8. The resilient support device as claimed in claim 4, wherein said first helical element is free be moved axially in either direction along said guide shaft.

9. The resilient support device as claimed in claim 4, wherein:

said first and second helical elements are threadably intertwined; and said second helical element is threadably translated in lead screw fashion in either direction axially along said guide shaft by rotation of said first helical element for the purpose of controlling the overall length and associated spring characteristics of the inner coil spring assembly.

10. The resilient support device as claimed in claim 7, wherein said guide shaft has a hexagonal cross-section, and one end of said second helical element is crimped to lie along a flat face of said hexagonal cross-section to achieve rotational restraint of said second helical element with respect to said guide shaft.

11. The resilient support device as claimed in claim 7, wherein said guide shaft has an axial groove therein, one end of said second helical element being formed to lie in said groove of said guide shaft to achieve rotational restraint of said second helical element with respect to said guide shaft.

12. The resilient support device as claimed in claim 4, wherein said two said helical elements are formed with wires of different diameters.

13. The resilient support device as claimed in claim 5, wherein said adjacent containment cap is provided with a plurality of notches to form detents to hold said extension and maintain any established rotational position of said extension of said first element.

14. The resilient support device as claimed in claim 1 for use in a light vehicle having a seat, wherein said support device is installed beneath the seat of the light vehicle.

15. The resilient support device as claimed in claim 2 for use in a light vehicle having a wheel strut, wherein said support device is installed in the wheel strut of the light vehicle.

16. The resilient support device as claimed in claim 2 for use in a light vehicle having a front wheel fork with depending legs, wherein a said support device is installed in each leg of the front wheel fork of the light vehicle.

17. The resilient support device as claimed in claim 2, wherein said outer spring is wound in single conical fashion, one of said containment caps being suitably enlarged to retain the larger diameter end.

18. The resilient support device as claimed in claim 2, wherein said outer spring is wound in double conical fashion with the large diameter region lying essentially at the midpoint of said outer spring.

19. The resilient support device as claimed in claim 2, wherein said outer spring is wound in barrel shaped fashion with the large diameter region lying essentially at the midpoint of said outer spring.

20. The resilient support device as claimed in claim 5, wherein:

one of said support parts has radial serrations at its end adjacent a corresponding one of said containment caps; and said adjacent corresponding containment cap has radial serrations meshing with said radial serrations of said one support part; whereby said containment cap and corresponding support part are locked against relative rotation until a force applied to said lever is sufficient to move said serrations past one another against the bias of at least said outer spring.

21. The resilient support device as claimed in claim 1, comprising adjustment means for imparting an initial stress in at least said outer coil spring.

* * * * *